United States Patent
Bushong

(10) Patent No.: US 8,662,813 B2
(45) Date of Patent: Mar. 4, 2014

(54) LOADING APPARATUS FOR TRANSPORT CONTAINER

(76) Inventor: Greg R. Bushong, Loomis, CA (US)

(*) Notice: Subject to any disclaimer, the term of this patent is extended or adjusted under 35 U.S.C. 154(b) by 359 days.

(21) Appl. No.: 13/012,397

(22) Filed: Jan. 24, 2011

(65) Prior Publication Data

US 2011/0182705 A1      Jul. 28, 2011

Related U.S. Application Data

(60) Provisional application No. 61/297,438, filed on Jan. 22, 2010.

(51) Int. Cl.
*B65G 65/34*     (2006.01)

(52) U.S. Cl.
USPC ..................................... 414/416.04

(58) Field of Classification Search
USPC ........ 414/373, 389, 398, 400, 416.03, 416.04
See application file for complete search history.

(56) References Cited

U.S. PATENT DOCUMENTS

| | | | |
|---|---|---|---|
| 2,707,573 A * | 5/1955 | Balwics | 414/608 |
| 3,952,887 A * | 4/1976 | Lutz | 414/392 |
| 4,195,959 A * | 4/1980 | Schmitt | 414/788.9 |
| 4,729,304 A | 3/1988 | Gardella | |
| 4,919,582 A * | 4/1990 | Bates et al. | 414/233 |
| 5,017,076 A | 5/1991 | Condrey | |
| 5,044,870 A | 9/1991 | Foster | |
| 5,186,596 A * | 2/1993 | Boucher et al. | 414/395 |
| 5,346,352 A * | 9/1994 | Ito | 414/400 |
| 6,146,078 A | 11/2000 | Hamill | |
| 7,172,382 B2 | 2/2007 | Frankel | |
| 7,275,906 B1 | 10/2007 | Pool | |
| 7,588,406 B2 | 9/2009 | Frankel | |
| 7,699,575 B2 | 4/2010 | Frankel | |
| 7,744,330 B2 | 6/2010 | Haub | |
| 7,837,428 B2 | 11/2010 | Adams | |
| 8,257,007 B2 * | 9/2012 | Williams et al. | 414/395 |
| 2008/0038100 A1 * | 2/2008 | Frankel | 414/280 |
| 2010/0266374 A1 | 10/2010 | Haub | |

* cited by examiner

*Primary Examiner* — Stephen Vu
*Assistant Examiner* — Glenn Myers
(74) *Attorney, Agent, or Firm* — Standley Law Group LLP

(57) ABSTRACT

An apparatus (10) for loading a transport container with a load of bulk material has a load bin (20) positioned for axial movement atop a base assembly (40). A packer blade (90) is positioned inside the load bin for movement relative to the load bin in the same axial direction. The load bin has an open first end (22) and a second end (24), with a pair of vertical side walls (66) and a substantially open top surface. Drivers (60, 92) are provided for the axial movements. Material is loaded into the load bin, the openable end of the transport container is placed around the first end of the load bin, and the load bin is extended into the transport container until the packer blade is inside the transport container. By retracting the load bin while retaining the packer blade inside the container, the load is transferred.

8 Claims, 5 Drawing Sheets

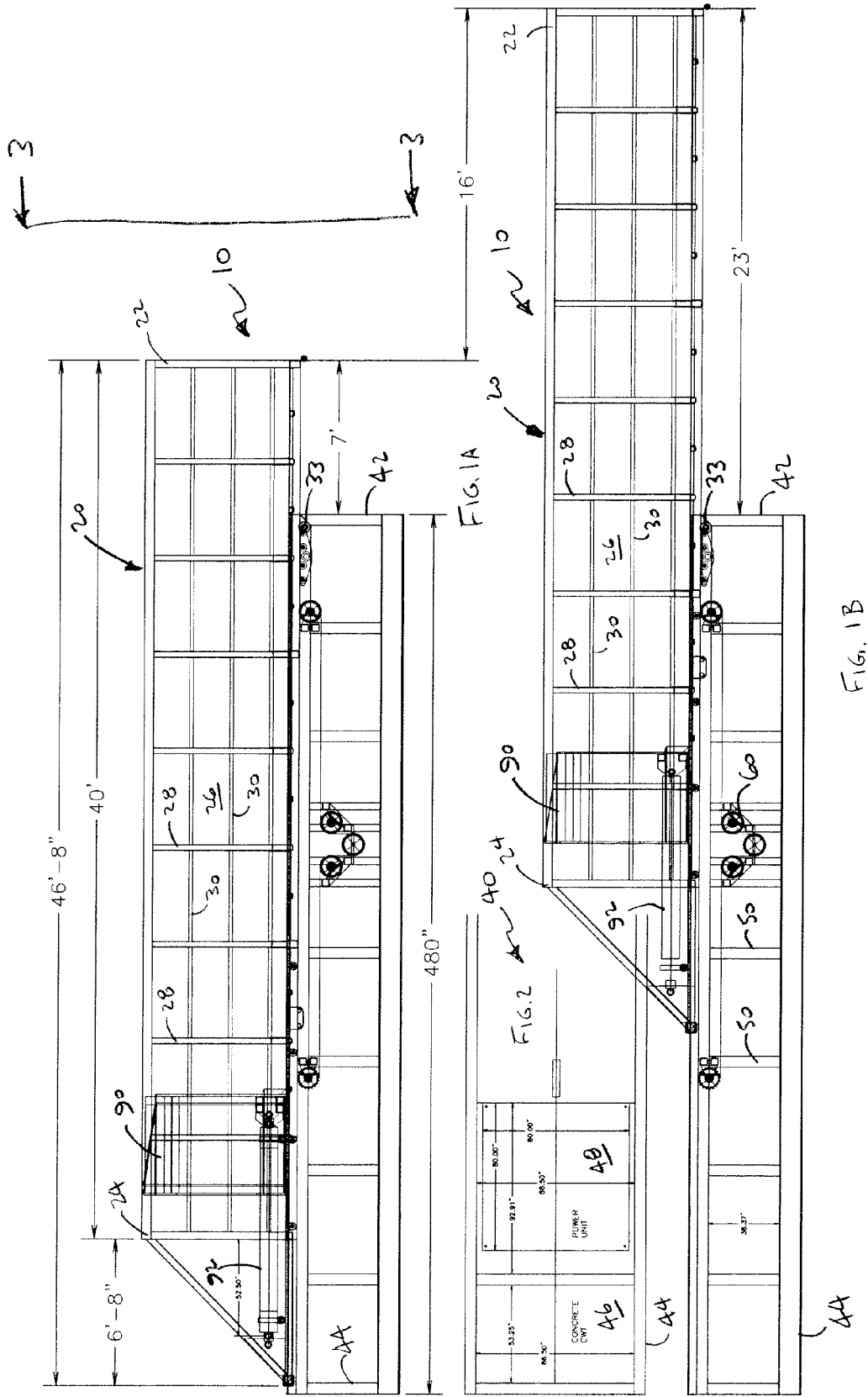

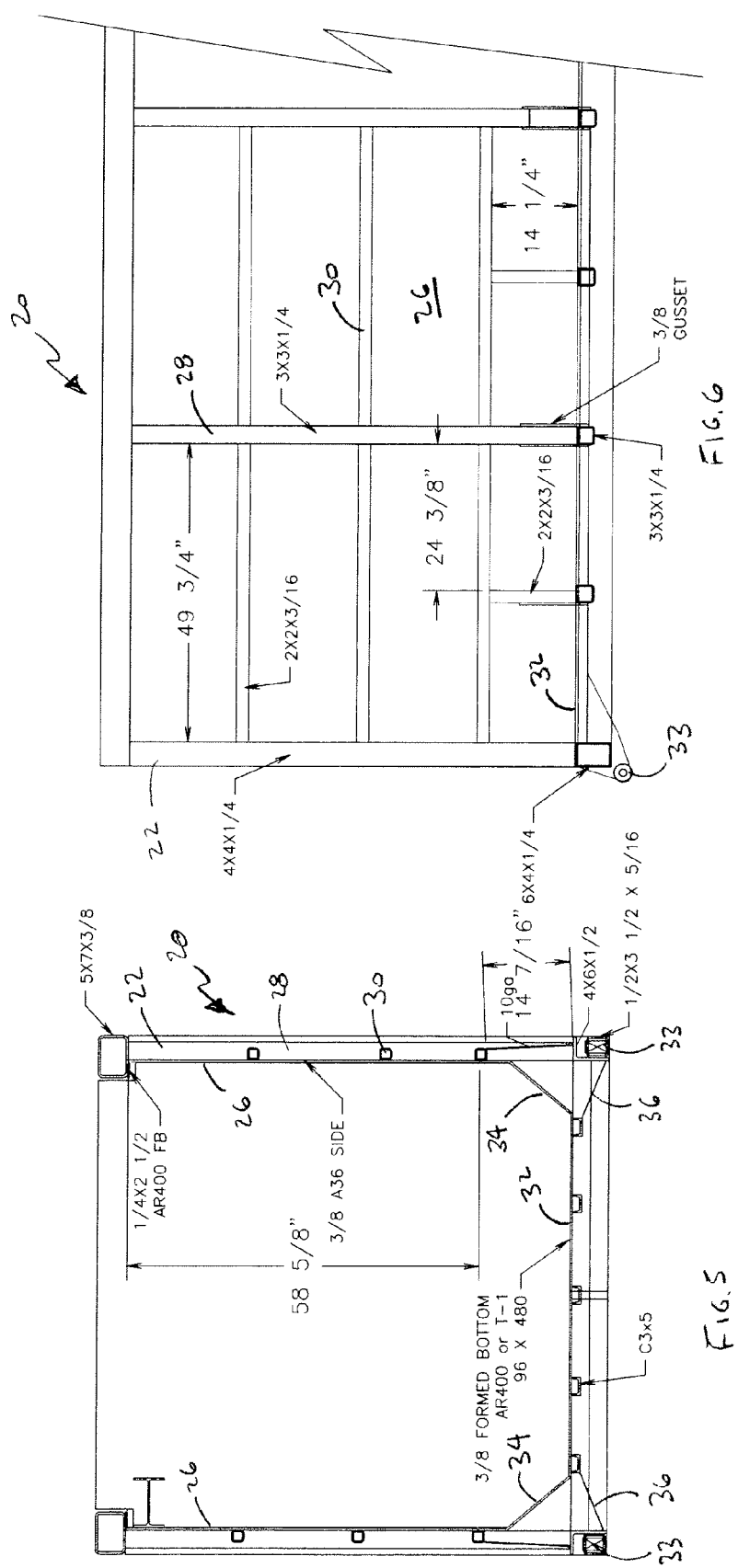

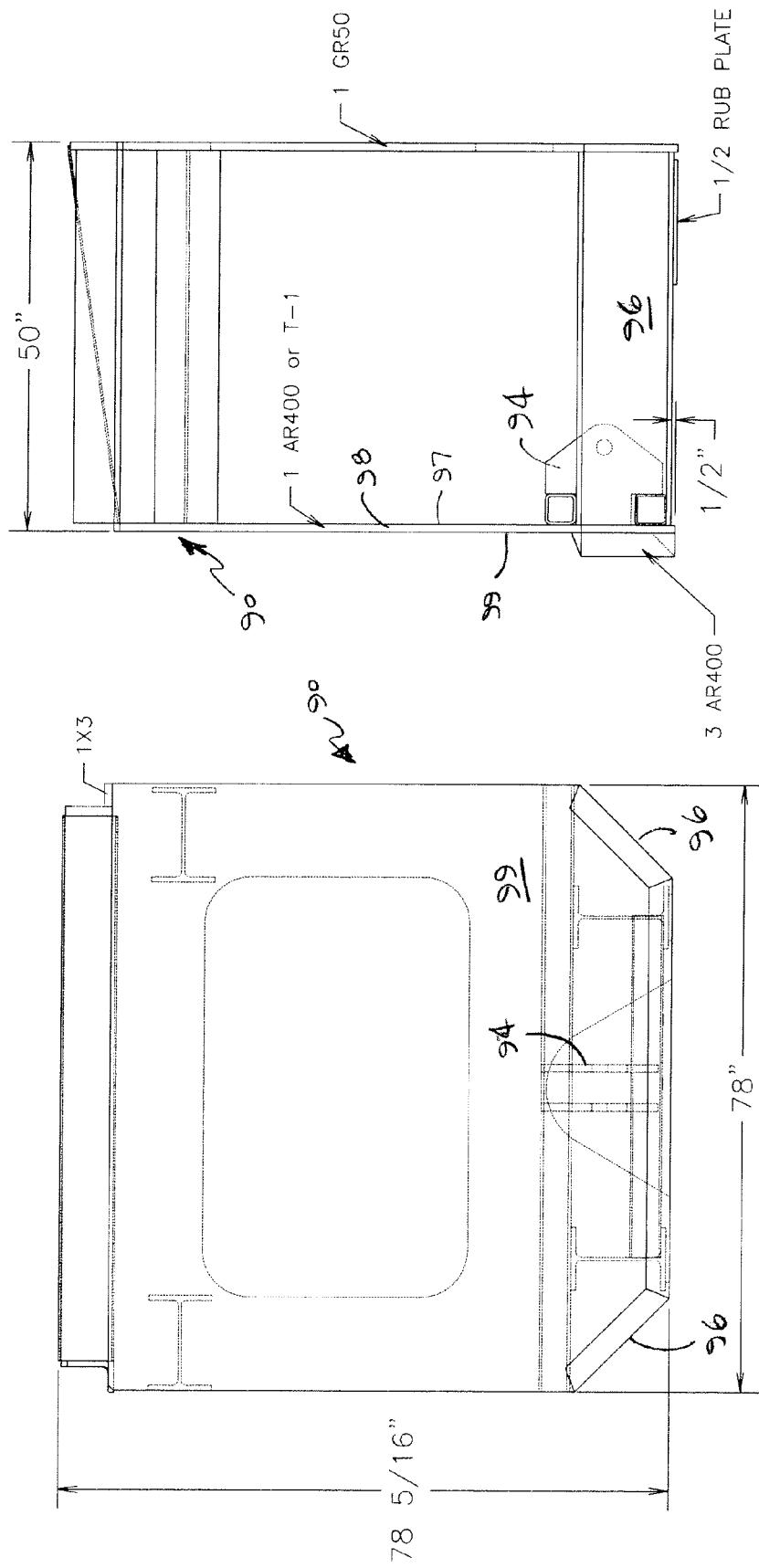

LOADING APPARATUS FOR TRANSPORT CONTAINER

CROSS-REFERENCE TO RELATED APPLICATIONS

This application is a non-provisional of, and makes a claim of priority to, U.S. 61/297,438, filed on 22 Jan. 2010, which is incorporated by reference as if fully recited herein.

TECHNICAL FIELD

The disclosed embodiments relate to a device for loading a material into a transport container, as well as to a method for using such a device.

BACKGROUND

The incentives for providing a device for loading a material, and especially a bulk material, in a transport container of a standardized size, are provided in U.S. Pat. Nos. 7,172,382 and 7,588,406, both of which are issued to Nathan Frankel.

Because the transport container is primarily a hollow rectangular solid that is open on an end rather than on the top, the process of filling the transport container necessarily occurs sequentially from the innermost end of the transport container and retreats towards the open end. As Frankel properly notes, this has previously been accomplished by use of palletized units or by use of skid-steer loaders.

It is therefore an unmet advantage of the prior art to provide a device and a method for using the device, where a load of bulk material can be moved easily and in a single loading operation from a load bin into a transport container, especially where the movement of the bulk material into the transport container is at least in part controlled by axial movement of a packer blade within the load bin.

SUMMARY

This and other unmet advantages are provided by the apparatus and method described, shown and claimed in more detail below.

The apparatus allows the loading of a transport container with a load of bulk material, the load being of sufficient size to substantially fill the transport container to capacity in a single operation, rather than in a series of stepwise operations, such as using palletized units or using skid steer units.

The apparatus comprises a load bin, a packer blade and a base assembly, as well as means for driving the packer blade relative to the load bin and means for driving the load bin relative to the base assembly.

The load bin has an open first end and a second end, with a pair of vertical side walls and a substantially open top surface. The packer blade effectively closes the second end of the load bin and can be moved within the load bin along the bin's longitudinal axis, from a retracted position near the second end of the load bin to an extended position in the direction of the first end. The load bin is positioned atop the base assembly, and is movable along a longitudinal axis of the base assembly between an extended position and a retracted position. The load bin and base assembly are of substantially the same length.

In some embodiments, a counterweight is provided in a second end of the base assembly, where a power unit, operatively engaged with the drive means, is also located.

The load bin has a width corresponding to a width of the transport container with which the apparatus is used, for insertion of the load bin into the openable end of the transport container.

In preferred embodiments, the packer blade and the load bin have co-acting means for guiding the relative movement of them In the preferred embodiments, the first end of the load bin is devoid of any door or closure means that could obstruct free passage of the bulk material being transferred from the load bin into the transport container.

The method for loading a transport container having an openable end with an load of bulk material in a single operation is performed with the apparatus as described. The method comprises the steps of: loading the load bin of the apparatus with the bulk material with the packer blade positioned in the retracted position; positioning the openable end of the transport container around the first end of the load bin, such that the first end passing into an interior of the transport container; disposing the bulk material inside the transport container by at least moving the first end of the load bin further into the interior by moving the load bin toward the extended position relative to the base assembly such that the packer blade is inside the transport container; transferring the bulk material from the load bin into the transport container by simultaneously moving the load bin toward the retracted position while maintaining the packer blade inside the transport container; and moving the transport container relative to the load bin, so that the first end of the load bin passes out of the transport contain through the openable end thereof.

In some embodiments of the method, the loading step occurs while the load bin is in the retracted position on the base assembly.

In some embodiments, the loading step occurs after the positioning step has placed the first end of the load bin into the transport container interior, while, in other embodiments, the loading step occurs before the positioning step has placed the first end of the load bin into the transport container interior.

BRIEF DESCRIPTION OF THE DRAWINGS

A better understanding of the disclosed embodiments will be obtained from a reading of the following detailed description and the accompanying drawings wherein identical reference characters refer to identical parts and in which:

FIGS. 1A and 1B are elevation side views of a container-loading apparatus in retracted and extended positions;

FIG. 2 is a top plan view of a portion of a base assembly of the loading apparatus;

FIG. 5 is a elevation end view of the load bin of FIG. 3, isolated from the base assembly;

FIG. 6 is an elevation side view of the load bin of FIG. 3, isolated from the base assembly;

FIG. 7 is a front elevation view of the packer blade, isolated from the load bin; and FIG. 8 is a side elevation view of the packer blade of FIG. 7.

DETAILED DESCRIPTION OF A PREFERRED EMBODIMENT

Figure 3:
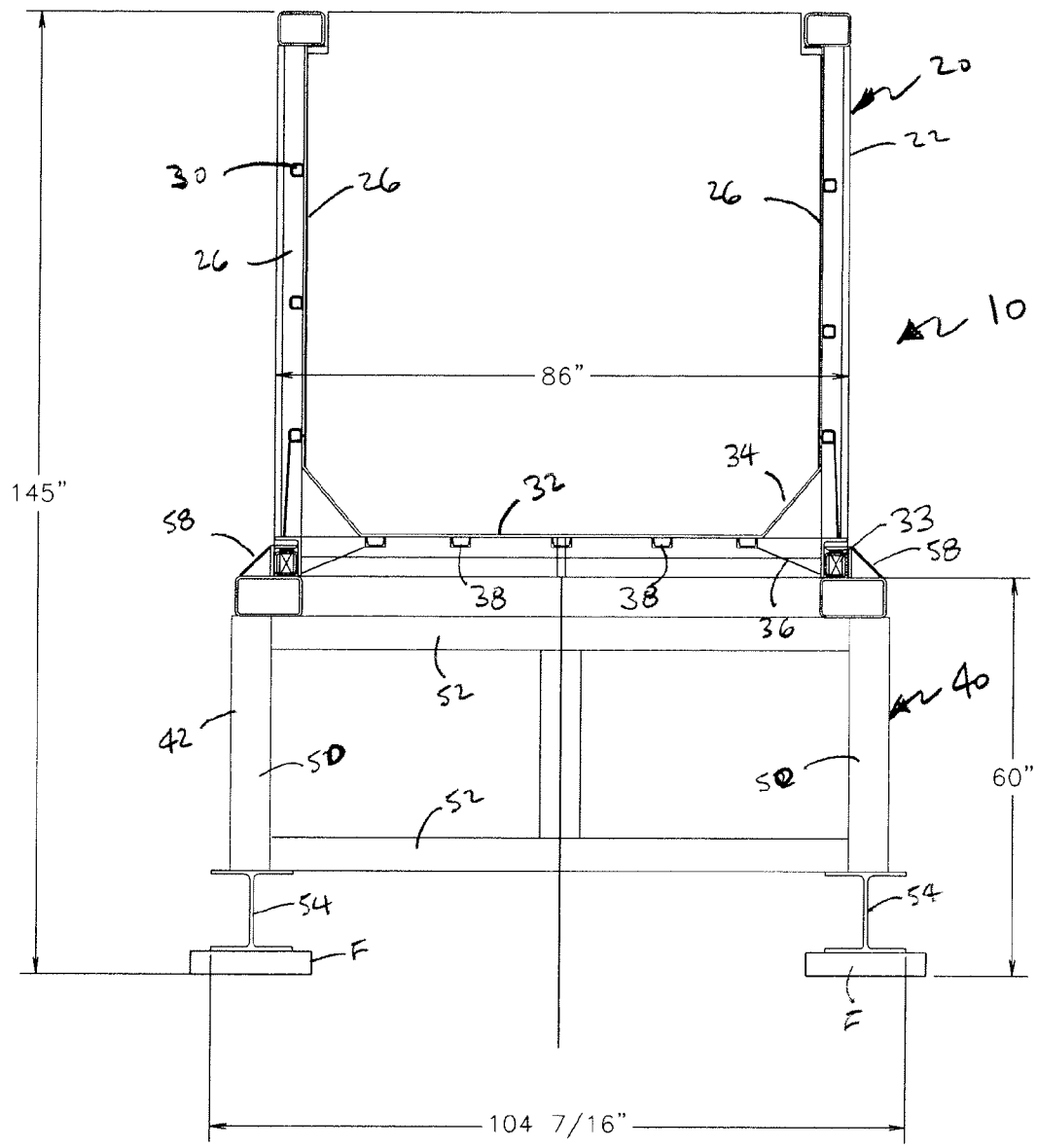
FIG. 3 is an elevation end view of the apparatus, taken along line 3-3 of FIG. 1.

FIGS. 1A and 1B are side elevation views of an apparatus 10 for loading a transport container (not shown). In FIG. 1A, the apparatus 10 is in a retracted position, which is used for loading a load bin 20 of the apparatus. In FIG. 1B, the apparatus 10 is in an extended position, such that the load bin 20 would be extending into the container. In either position, the load bin 20 is seated atop a base assembly 40. The load bin 20 is essentially the same length as the base assembly 40. In the example shown, both the load bin 20 and the base assembly 40 are 40 ft long.

A first end 22 of the load bin 20 extends beyond a first end 42 of the base assembly 40 even in the retracted position of FIG. 1A, but may be driven by a drive mechanism 60 that is positioned between the base assembly 40 and the load bin 20. As seen from FIG. 2, which is a top plan view of a second end 44 of the base assembly, a counterweight 46 and a power unit 48 are provided in the base assembly 40. It is notable in these figures that the base assembly 40 does not extend upwardly around the sides of the load bin 20 and does not frame the load bin. It is also notable that this means that the overall width of the device 10 is generally of the same width as that of the transport container with which it is used, as there is no need for a laterally-extending support assembly. Power unit 48 is operatively engaged with the drive mechanism 60, for movement of the load bin 20 along a longitudinal axis of the base assembly that runs from the first to the second end. In the depicted embodiment, drive mechanism 60 is a chain-and-sprocket drive, but alternative drives, especially a hydraulic drive, is certainly applicable and can be implemented by one of skill in this art.

The load bin 20 comprises a pair of vertical side walls 26, one of which is visible in FIGS. 1A and 1B, the view of the second side wall being obstructed by the first side wall. The respective side walls 26 are affixed at a lower end of each to a floor, which is also not visible in FIGS. 1A and 1B, but which is seen in FIG. 3. A top surface of the load bin 20 remains substantially open, allowing the load bin to be filled from above while in the retracted position. In some embodiments, there may be one or more horizontal support members to assist the floor in maintaining the side walls 26 in parallel relationship, but no such horizontal support members are depicted in FIGS. 1A and 1B. The outwardly-facing surface of each side wall 26, that is, the surface facing away from the floor of the load bin 20, may be bolstered by one or more vertical support members 28 and/or one or more horizontal support members 30.

A first end 22 of the load bin 20 is preferably left open and unobstructed by any gate or other closure. In the preferred modes, this first end 22 provides no surfaces that would obstruct free passage of the bulk material during the process of transferring it into a transport container. Access to the interior of the load bin 20 at the opposite second end 24 is generally precluded by a movable packer blade 90, which is described in more detail below. With the vertical side walls 26, the floor (shown in FIG. 3) and the movable packer blade 90, a load cavity is defined in the load bin 20 which may be filled through the open top surface or through the open first end 22.

The movable packer blade 90 is normally positioned at the second end 24 of the load bin 20. In the disclosed embodiment, a structure 32, which is attached to the load bin 20, houses a drive mechanism 92 that, when actuated, moves the packer blade 90 along a longitudinal axis of the load bin 20 towards or away from the first end 22. As depicted, drive mechanism 92 is a hydraulic drive, although other means for driving the packer blade, such as a screw drive, a chain-and-sprocket drive, as well as others, will be known to those of skill. It is preferred that, whatever drive mechanism 92 is used, it should serve as a brake against movement of the packer blade 90 in either direction when the drive means is not actuated. In cases where the drive means for the load bin 20 is a hydraulic drive, the implementation will be similar to that shown with drive mechanism 92.

Attention is now directed to FIG. 3, where an elevation view taken along line 3-3 of FIG. 1, is presented. Notable here is the relationship of the load bin 20 with base assembly 40. The base assembly 40 is depicted as comprising a generally open framework of vertical beams 50 and horizontal beams 52. The base assembly 40 is depicted as having I-beam feet 54 that may be secured to a footer slab F. Along the top surface of the base assembly, the depicted apparatus 10 has a pair of track-like slots 56 for receiving the load bin 20, and especially a roller means 33 thereof, with an inwardly-directed gusset 58 along the length of each slot.

FIG. 3 also shows the floor 32 of the load bin 20, which spans the vertical side walls 26. The floor 32 is held in place by upper and lower gussets 34, 36 and longitudinal support members 38. The upper gussets 34 are also useful in defining, along with the interior surfaces of the vertical side walls 26, a track along which the packer blade (not shown in FIG. 3) can be driven in the axial direction of the load bin 20. The vertical and horizontal support members 28, 30 described above are also seen in FIG. 3.

Figure 4:
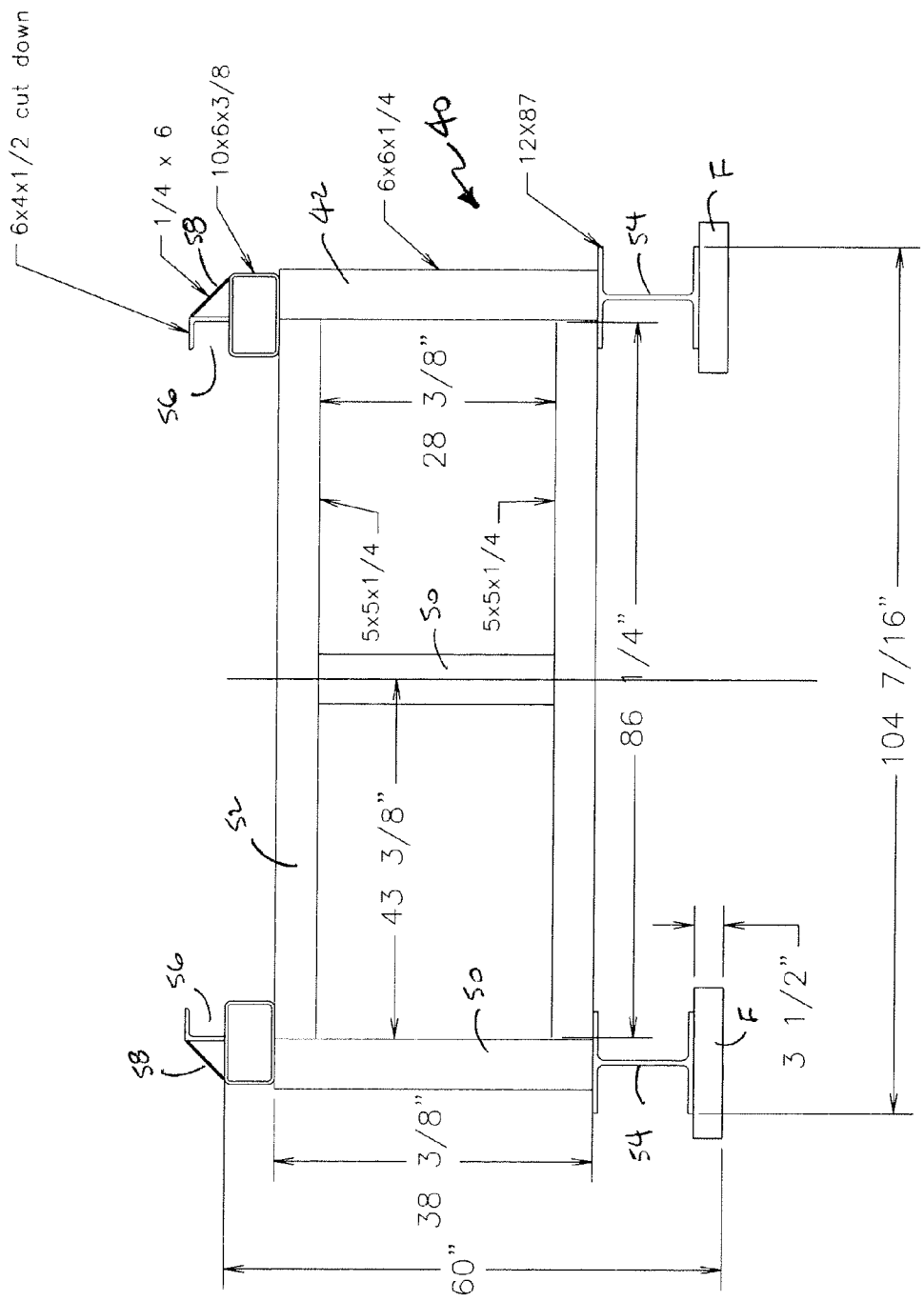
FIG. 4 is an enlarged end elevation view of the base assembly of FIG. 3, isolated from the overall apparatus.

FIG. 4 shows, in enlarged end elevation view, the base assembly 40, although isolated from the overall apparatus 10, and especially from the load bin 20. This view is especially useful for depicting the slot 56 in which the roller means 33 are received.

FIGS. 5 and 6 show, in respective enlarged end and side elevation views, the load bin 20, although isolated from the overall apparatus 10, and especially from the base assembly 40. These views are especially useful for depicting the roller means 33 that are received in slot 56 of the base assembly. It is noted that the interior surfaces of the load bin should be smooth and without inwardly extending fasteners and the like, so that the packer blade 90 can move in the load bin without obstruction.

FIGS. 7 and 8 are enlarged front and side elevation views of the packer blade 90. Notable in these figures is the coupling 94 for linking the drive mechanism (not shown) and the angled corners 96 which slide upon gussets 34 of the load bin 20 when the packer blade 90 is axially displaced inside the load bin. Also notable is the placement of the coupling 94 on a rear side 97 of a front panel 98, a front side of the front panel facing into the load cavity. To provide structural support to the front panel 98 for the movable packer blade 90 in its function of driving the bulk material out of the load cavity, the angled corners 96 and I-beams 100 are shown as an exemplary embodiment.

The use of the apparatus 10 is exemplified by the depictions in FIGS. 1 and 2. When used, an unpalletized load of a material with sufficient size to substantially fill a transport container to capacity is transferred from the apparatus to the transport container in a single operation. The first step is preferably accomplished while the apparatus 10 is in the configuration of FIG. 1, but this is merely preferred and not required. With the load bin 20 positioned substantially atop the base assembly 40, the unpalletized material is loaded into the load bin. Preferably, this occurs through the open top surface of the load bin 20. To the extent that a full transport container load can be placed into the load bin 20 without filling the internal volume, it is preferred to place the material into the portion of the load bin that is atop the base assembly, rather than in the portion that is near the open first end 22. In many embodiments, the apparatus 10 may be equipped with appropriate weighing means, such as a set of load cells, so that the net weight of material added to the load bin may be monitored in real-time. If the load bin 20 is filled in the retracted position of FIG. 1, it will need to be moved to the extended position of FIG. 2 in order to complete the transfer to the transport container. This can be accomplished in several manners.

In one situation, the load bin 20 is filled in the retracted position. The load bin 20 is moved to the extended position by using drive means 60 and the transport container is moved around the extended portion of the load bin, with the first end 22 of the load bin passing into the interior of the transport container through the open end of the transport container. At this point, the packer blade 90 of the load bin is advanced, if necessary, using the drive means 92 until the packer blade is inside the transport container and the entire unpalletized load is fully disposed inside the transport container.

In another situation, the load bin 20 is filled in the retracted position, but, before the load bin is moved to the extended position, the transport container is moved proximate to the apparatus 10 at the first end 22 of the load bin. Then, by extending the load bin into the FIG. 2 position, using the drive means 60, while the transport container is stationary, the first end 22 of the load bin is inserted into the open end of the transport container. As in the first method, the packer blade 90 of the load bin is advanced, if necessary, using drive means 92, until it is inside the transport container and the entire unpalletized load is fully disposed inside the transport container.

In the third situation, the load bin is filled while in the extended position of FIG. 2. The transport container is moved around the extended portion of the load bin, with the first end of the load bin passing into the transport container through the open end of the transport container. At this point, the packer blade 90 of the load bin is advanced, if necessary, using drive means 92, until it is inside the transport container and the entire unpalletized load is fully disposed inside the transport container. In this situation, as in the others, the packer blade 90 may not need to be advanced separately from the load bin, as the relative motion of the load bin and the transport container may be sufficient to place the packer blade internal to the transport container.

In any of these situations, the result to this point is substantially the same, with the packer blade 90 internal to the transport container and the unpalletized load residing in the load bin 20. By simultaneously operating the drive means 60 that move the load bin relative to the base assembly and the drive means 92 that positions the packer blade 90 inside the load bin 20, the unpalletized load is transferred by retracting the load bin from the transport container in the direction of the base assembly while maintaining the packer blade inside the transport container by advancing the packer blade towards the first end of the load bin.

Once the unpalletized load is transferred, the transport container is moved away from the apparatus, separating the load bin from the interior of the transport container. The open end of the transport container is closed to secure the unpalletized load, which remains inside the transport container. The load bin may now be re-filled with unpalletized material and the process repeated.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention.

What is claimed is:

1. An apparatus for loading a transport container with a load of bulk material, the load being of sufficient size to substantially fill the transport container to capacity in a single operation, the apparatus comprising:
    a load bin, having an unobstructed first end and a second end, the load bin comprising a floor, a pair of vertical side walls, and a gusset on each vertical side wall that extends into an interior of the load bin and secures the vertical side wall to the floor, the load bin having a substantially open top surface;
    a packer blade, effectively closing the second end of the load bin and movable along a longitudinal axis of the load bin interior on a track defined by the gussets and the vertical side walls, from a retracted position near the second end of the load bin to an extended position in the direction of the open first end;
    a base assembly, upon which the load bin is positioned for movement between an extended position and a retracted position along a longitudinal axis of the base assembly extending from a first end to a second end of the base assembly; and
    means for driving the load bin relative to the base assembly; and
    means for driving the packer blade relative to the load bin.

2. The apparatus of claim 1, wherein:
    the load bin and base assembly are of substantially the same length.

3. The apparatus of claim 1, further comprising:
    a counterweight, located in the second end of the base assembly.

4. The apparatus of claim 1, further comprising:
    a power unit, operatively engaged with the driving means for the load bin.

5. The apparatus of claim 1, wherein:
    the load bin has a width corresponding to a width of the transport container with which the apparatus is used.

6. The apparatus of claim 1, wherein:
    the driving means for the load bin is a hydraulic drive.

7. The apparatus of claim 1, wherein:
    the driving means for the packer blade is a hydraulic drive.

8. The apparatus of claim 1, wherein:
    the open first end of the load bin is devoid of any door or closing means.

* * * * *